US006762866B2

(12) United States Patent
Carra

(10) Patent No.: US 6,762,866 B2
(45) Date of Patent: Jul. 13, 2004

(54) HIGH SPEED MECHANICAL LASER SHUTTER

(75) Inventor: William M. Carra, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 269 days.

(21) Appl. No.: 10/004,938

(22) Filed: Dec. 3, 2001

(65) Prior Publication Data

US 2003/0197955 A1 Oct. 23, 2003

(51) Int. Cl.⁷ .............................................. G02B 26/08
(52) U.S. Cl. ...................................... 359/198; 359/220
(58) Field of Search ................................ 359/196–198, 359/220, 230

(56) References Cited

U.S. PATENT DOCUMENTS

| | | | |
|---|---|---|---|
| 4,721,894 A | 1/1988 | Graber | 318/473 |
| 5,032,005 A | 7/1991 | Woodruff | 359/230 |
| 5,097,110 A * | 3/1992 | Hamada et al. | 219/121.63 |
| 5,154,707 A | 10/1992 | Rink et al. | 606/12 |
| 5,576,901 A | 11/1996 | Hanchett | 359/877 |
| 6,100,497 A * | 8/2000 | Maruyama et al. | 219/121.63 |

FOREIGN PATENT DOCUMENTS

| | | | |
|---|---|---|---|
| JP | 57042003 A * | 9/1982 | |
| WO | WO 01/85386 A3 | 11/2001 | |
| WO | WO 01/85386 A2 | 11/2001 | |

* cited by examiner

Primary Examiner—Georgia Epps
Assistant Examiner—William Choi
(74) Attorney, Agent, or Firm—Jackson Walker LLP; Robert C. Klinger

(57) ABSTRACT

A fast mechanical shutter for a laser has a reflective flag which either blocks or unblocks the laser output. In the blocking position, the flag reflects the light onto a laser output absorber. The flag is rapidly moved by an electric actuator into which shaped current pulses are forced to determine the velocity, acceleration, deceleration and position of the flag. Absent a current pulse, the flag remains in its extant position. Sensors detect and produce an error signal if (i) the flag is in a selected position or (ii) if the actuator or the laser overheat. The error signal moves the flag to its blocking position, terminates laser operation and produces an alarm. Exemplary actuators include rotary actuators, such as solenoids and AC or DC motors that can be rapidly operated by shaped current pulses. A computer may direct the operation of the shutter and the laser.

10 Claims, 2 Drawing Sheets

HIGH SPEED MECHANICAL LASER SHUTTER

FIELD OF THE INVENTION

The present invention relates to a high speed mechanical laser shutter, and more specifically to a fast mechanical laser shutter having high power handling capability and suitable for continuous operation in conjunction with a high-power laser used in industrial processes such as machining, welding, deposition and other manufacturing operations.

BACKGROUND OF THE INVENTION

Shutters for selectively interrupting (blocking or diverting) or letting pass the optical output of high power lasers used in industrial processes and manufacturing operations are known. In use, the shutter is moved to either block—and receive the energy of—a laser beam or is moved out of the path of the laser beam permitting it and its energy to be applied to a workpiece or work surface.

In the past a solenoid-operated shutter has been driven from a closed (blocking) position to an open (unblocking) position by selectively energizing the solenoid. The return of the shutter to its normal closed position has been effected by springs or gravity. The opening and closing times of such shutters have been found to be unequal and difficult to control. Since the amount of energy applied by the laser to a work surface or workpiece is proportional to the time the shutter is open, this lack of control of shutter opening and closing times results in a lack of control over the amount of laser energy applied.

Iris-type shutters are also known. These camera-like shutters contain a number of interleaved planar members that are simultaneously rotated about their respective axes, that are all spaced from a central axis, to open an expanding diameter light path or to close a diminishing diameter light path. Iris shutters have been found to be unable to withstand the level of energy present in high-power continuous laser outputs and easily become damaged thereby.

Electro-optical shutters have also been used to pass or interrupt laser outputs. These have been found to be unsuitable for use with high-power laser outputs. Specifically, electro-optic shutters have been found even when open to absorb substantial energy from an incident laser beam. When used with a high power continuous laser, this type of shutter either overheat and fails or allows too much energy pass when it is "closed."

One goal of the present invention is to provide a fast mechanical shutter for use with high-power, continuous lasers, a shutter that can be opened and closed in a highly repeatable and controllable manner—that is, the opening times and the closing times may be selectively adjusted—to repeatably and accurately control the amount of laser energy that is applied to a workpiece and that is suitable for use with continuous laser operation.

SUMMARY OF THE INVENTION

With the foregoing and other goals in view, the present invention in its broadest aspect contemplates an actuator for moving a mechanical shutter between a first position, whereat the shutter blocks the passage of a light beam, such as that produced by a continuous high power laser, and a second position whereat the shutter permits passage of the light beam. The shutter may include a mirror which is highly reflective at the wavelength of the light. In the second shutter position, the mirror, which may be planar or convex blocks the light and reflects away from the path and onto an efficient light absorber.

The actuator includes a bi-directional, preferably rotary drive or actuator, such as a solenoid, a multi-phase AC motor or a brushless driver, a movable member of which, such as an armature or rotor, is both selectively movable and carries the mirror of the shutter. The movable member is movable between respective first and second positions, at which the shutter is in its first and second position. The movable member is selectively positively driven by a selectively energized current source into one of its positions, in which it remains until positively driven into its other position. An important feature of the shutter is that it must be driven positively into both its opened (second) and closed (first) positions. No mechanical (i.e., spring) or magnetic biasing is relied on to move the shutter to its first and second positions or to any "neutral" position therebetween. Further, because the shutter is positively driven, its opening time and speed and its position between the extreme positions may be selected by the user.

In a somewhat narrower vein, the movable member of the rotary actuator is selectively driven by first and second shaped current signals or pulses. The shape of the pulses is such that the rotary member may be very rapidly moved from one position to the other and held there until a subsequent pulse moves it to its other position. The shape of the pulses permits the velocity and the position of the armature to be controlled. This control permits precise control of the duration and the amount of light, and accordingly of the duration and amount of energy.

In other aspects, the present invention relates to a fast mechanical shutter for selectively intercepting or permitting to pass a laser beam. When the beam is intercepted, the shutter deflects it onto an absorber.

The shutter includes a bi-directional rotary actuator or driver, such as a solenoid, or an AC or DC motor. The Movable member of the rotary actuator, such as an armature or rotor is movable between a first position and a second position by energization thereof, specifically the application of selected, respective first and second shaped current signals to the ststor, coil or winding of the of the rotary actuator. A flag, which may comprise or include a mirror that is highly reflective at the frequency of the laser output, is carried by the armature. The flag permits passage of the beam in the first position of the armature and intercepts the beam in the first armature position. If the flag includes the mirror, in the first armature position, the minor reflects the beam towards and onto a light absorber.

A first facility responds to a command—which may be issued in real time, or pursuant to a stored program, by a computer—by applying one or the other of the shaped current signals to the solenoid. If the armature is in its first position while the second shaped current signal is applied to the solenoid, the armature will be quickly moved to its second position at a rate determined by the shape of the signal. Similarly, if the armature is in its second position while the first shaped signal is applied to the solenoid, the armature will be quickly moved to its first position at a selected rate. If the solenoid receives the first or second shaped signal while the armature is already in the first or second position, the armature will not move. Thus, both the opening and closing of the shutter occur quickly, since the shutter must be positively driven into both positions, at rates determined by the character of the shaped signals.

In preferred embodiments, the first facility includes a controller that produces a pulse having a selected shape, and a power amplifier that applies the shaped pulses to the rotary actuator to operate the shutter.

A second facility monitors the position of the armature. The position of the shutter selected by the last-given command to the first facility and the actual position of the armature are continuously compared. If these do not match, a first error signal is produced. Preferably the shutter-position sensors are optical sensors. As with other error signals, the presence thereof effects the application of a first signal or pulse to the solenoid to close the shutter or hold the shutter in its closed position if it is already there.

A third facility continuously measures the temperature of the solenoid and the signal-applying facility. If the temperature of either exceeds a predetermined limit, a second error signal is produced. Again, as with the first error signal, the second error signal effects movement of the shutter to the closed position if it is not already there.

Either error signal may also effect the de-energization of the laser with which the shutter is used, as well as disabling the shutter after it has been moved to its closed position. Disabling the shutter may include first operating the first facility to apply the first shaped signal to the rotary actuator to ensure that the shutter is in the closed position wherein it intercepts the beam. The fault signal may also trigger the production of a human-sensible signal, such as a light or alarm that indicates a malfunction of the shutter.

DETAILED DESCRIPTION

Figure 1:
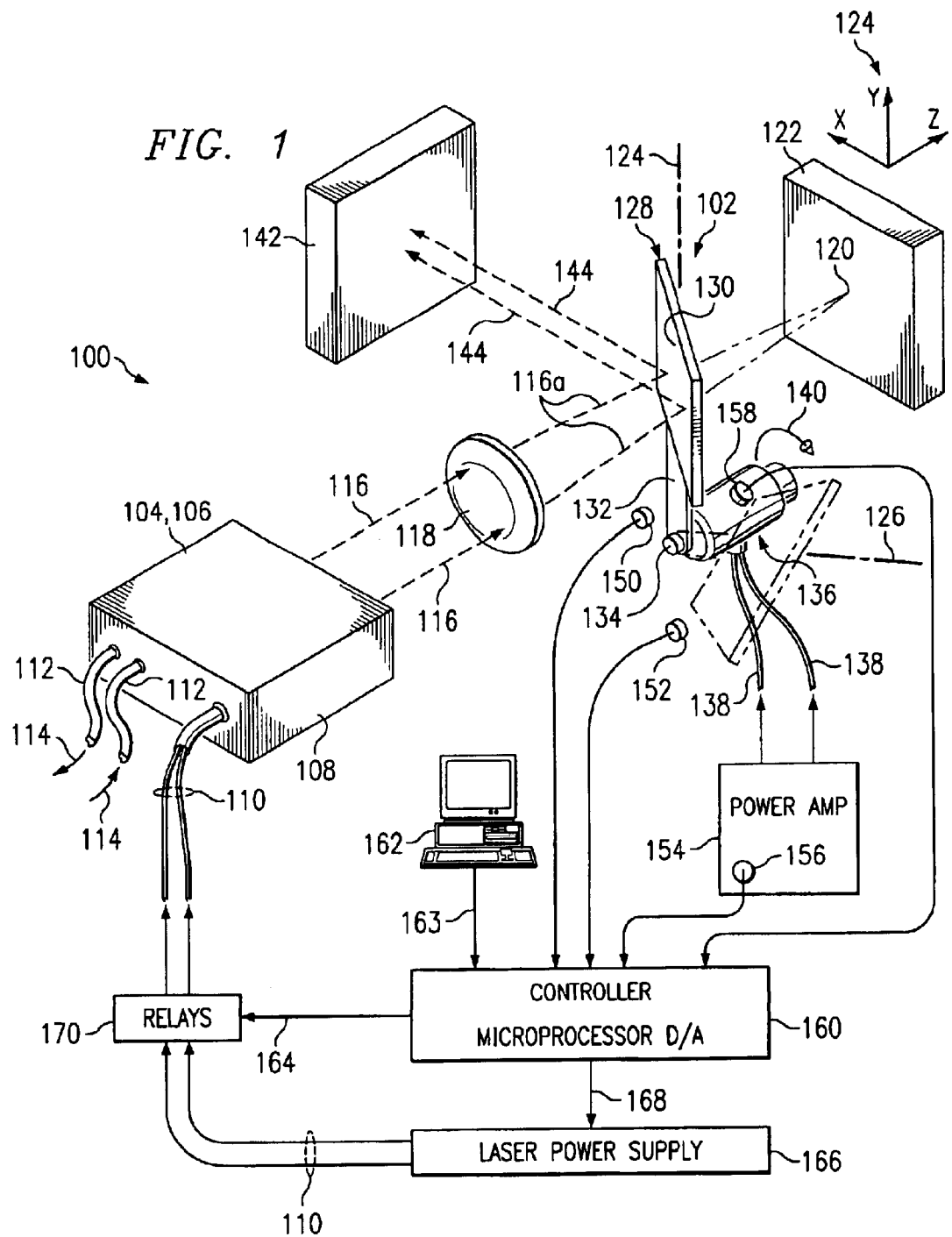
FIG. 1 is a generalized, perspective representation of a laser machining system which includes a shutter that is usable to pass or intercept a laser beam produced by the system and which also includes facilities for operating the shutter in a predetermined manner.

Referring first to FIG. 1, a schematic of a laser operating system 100, including a shutter 102 according to the present, are shown. As can be seen the shutter 102 is used in conjunction with a laser (not shown, but indicated at 104), which is preferably a high power (kilowatt level), continuous laser used to machine, weld, deposit materials or perform other manufacturing operations. Suitable lasers include neodynium/yttrium-aluminum-garnet ("YAG") lasers, though any high power laser suitable for machining, welding, depositing or other manufacturing operation may be used.

The laser 104 and its associated facilities, including cooling facilities (not shown but indicated at 106), are contained within a housing 108. Shown entering the rear of the housing 108 are power leads 110 to the laser 104 and hoses 112 through which a coolant moves as it is circulated by the cooling facilities 106, as indicated by the arrows 114.

The laser 104 may be selectively operated to produced a coherent light beam 116 which exits the front of the housing 108. The light beam 116 maybe focused by a lens system, generally indicated at 118, to produce a high energy "spot" 120 at a selected site on a work table or stage 122, the focused light being indicated at 116a. A workpiece (not shown) to be machined, welded, or have something deposited thereon rests or is held on the stage 122. As is known, the stage 122 is movable by facilities (not shown) in the "X", "V" and "Z" directions to apply the high energy spot 120 on the desired portion of the workpiece, as indicated by the axes 124. Although the stage 122 is depicted in FIG. 1 as vertically oriented and the light 116,116a from the laser as horizontally directed, it is clear that the orientation and direction of either may assume any desired orientation.

The shutter 102 of the present invention either intercepts and blocks the light beam 116a produced by the laser 104 or permits passage of the beam 116a therepast and onto the workpiece resting on the stage 122. The shutter 102 achieves the foregoing by occupying either a first position 124 (solid outline) which intercepts the beam 116a or a second position 126 (phantom outline) which is located away from the first position 124 so that the beam 116a by-passes the shutter 102 and reaches the stage 122.

The shutter 102 may comprise a generally planar flag 128 made of or coated with a dielectric material which can withstand the impingement thereon of the beam 116a and which blocks the beam 106 when the shutter 102 is in its first position 124. In preferred embodiments, the flag 128 is a dielectric material coated with a reflective coating 130. Thus, the coated flag 128,130 is a mirror. The coating is selected so that the flag acts as an efficient mirror for light having the wavelength of the light beam 116a. The mirror 128, 130 may be planar or non-planar, such as convex. FIG. 1 depicts a planar mirror 128,130.

The flag 128 is carried by an arm 132. The arm 132 is, in turn, carried by and rotated with a rotatable output shaft 134 of a rotary, bi-directional actuator, such as the solenoid 136 depicted in the Figure. Other rotary actuators 136, such as a multi-phase AC motor, a brushless DC motor or their functional equivalents to these actuators and solenoid actuators may also be used, in which event the shaft 134 may be connected to or integral with the relevant rotary output member, such as a motor rotor or armature.

The shaft 134 is rotated by and with the rotor (not shown) of the rotary actuator 136. The shutter 102, as well as the lens system 118, may be contained within the housing 108 instead of being located outside thereof as shown in FIG. 1. Selective energization of power leads 138 to the rotary actuator 136 effects rotation of the shaft 134 and, accordingly, of the arm 132 and the flag 128, between the respective first and second positions 124 and 126 and in either direction relative to the axis of the shaft 134, as indicated by the double-headed arrow 140.

The flag 128 may assume varying orientations relative to the plane of rotation of the arm 132. In FIG. 1, the flag 128 is not parallel to the plane of rotation of the arm 132. Rather, the flag 128 is angularly displaced relative to such plane of rotation. This angular displacement is of little consequence when the flag 128 is in its second position 126, but when it is in its first position 124, light 116a striking the angled reflective flag 128 is reflected thereby onto a light- and energy-absorbing body 142, as shown by the light beams 144. It is preferred that the flag 128 both block the light 116a and reflect it, as at 144, onto the light absorber 142 whenever the laser 104 is energized and the flag is in the first position 124. The light absorber 142 may be outside (as seen in FIG. 1) or inside the housing 108.

In FIG. 1 the plane or rotation of the flag 128 is depicted as normal to the light path 116a. This in combination with the angularity of the flag 128 relative to the plane of rotation of the arm 132 directs reflected light onto the light absorber 142 when the flag 128 is in its first position. This same end maybe realized by using a planar mirror 128,130 that is parallel to or coplanar with the plane of rotation of the arm 132, with such plane of rotation being not normal to the light path 116a. Further, the mirror 128,130 may be non-planar, the degree and type of non-planarity, the point of intersection between the mirror 128,130 and the orientation of the plane of rotation of the arm 132 to the light path 116a all being selected to direct w the reflected light 144 as desired to the absorber 142. In some embodiments, the mirror 128,130 is convex.

As diagrammatically shown in FIG. 1, the system 100 also includes sensors 150 and 152 that detect the presence or absence of the arm 132 and, thus, indirectly detect the position of the mirror 128,130 which is fixed to the arm 132. The sensors may also directly detect the position of the flag 128, or may indirectly detect the position of the flag 128 by sensing the position of the shaft 134 via markings or projections thereon.

These sensors 150,152 produce a first output when the flag 128 is adjacent thereto and a second output when the flag is absent therefrom. Specifically, when the flag 128 is in the first position 124, the sensor 150 produces the first output and the second sensor 152 produces the second output. The outputs are reversed when the flag 128 is in the second position 126. When the flag is traveling between the positions 124,126, both sensors 150,152 produce the second output.

A power amplifier 154 is operable to selectively energize the solenoid or other rotary actuator 136 to positively drive the flag 128 into its first or second position, as described more fully below. Proximately located with respect to the power amplifier 154 is a thermal sensor 156, that produces a first output if the temperature of the power amplifier 154 is within an acceptable range and a second output if that temperature becomes too high. Similarly, a thermal sensor 158 is proximately located relative to the solenoid 136 to the same end. A first output is produced by the sensor 158, unless the solenoid 136 becomes too hot, in which event a second signal is produced.

A controller 160 supervises the operation of the system. The controller 160 may be programmed to automatically effect such operation, but in some embodiments may itself be under the control of a PC 162 or similar device, as indicated by an input path 163. An operator can select various modes of operation of the system 100, particularly as such operation relates to the laser 104 being turned on and off and the position of the shutter 102, the condition of both items being dependent on the nature of the workpiece and the type of operation to be performed thereon.

The controller contains facilities which receive the outputs of the sensors 150,152,156,158. If the sensors 150 and 152 indicate that the shutter 102 is in a position that is different from the last position directed by the PC 162 and/or the controller 160, an error or fault signal is produced on an output 164 of the controller 160. Specifically, if the sensor 150 is producing a first output and the sensor 152 is producing a second output, both indicating that the shutter 102 is "closed" 124, and the PC 162 has directed that the shutter 102 be closed, no error signal is present on the output 164. If the sensor 150 is producing a second output and the sensor 152 is producing a first output—the shutter 102 is in the "open" position 126—but the PC 162 has directed that the shutter be closed, an error signal is produced on the output 164. If both sensors 150 and 152 are producing a second signal, indication that the shutter 102 is moving between its two positions 124,126, but the shutter 102 has not been directed by the PC 162 to so move, an error signal will be present on the output 164.

An important time in the operation of the system 100 as regards the function of the position sensors 150,152 occurs during the time that (i) the laser 104 is energized or remains energized if being continuously operated, (ii) the shutter 102 is moved from its first or closed position 124 to its second or open position 126, and (iii) the shutter 102 is then moved back to its closed position 124. The laser 104 may be de-energized following phase (iii), but may also continue to be energized, if it is operated continuously, as it awaits the next opening and closing of the shutter 102. Ideally, the total radiant energy received by the workpiece during the time that the shutter 102 is open is just sufficient to perform the desired work on the workpiece. If the shutter 102 does not close after a laser machining or other operation, too much radiant energy may be received by the workpiece to its detriment.

The operation of the thermal sensors 156,158 is similar to that described in the previous two paragraphs. If either the solenoid 136 or the power amplifier 154 become overheated or otherwise exceed their permissible operating temperatures, the appropriate sensor 156,158 will cease sending its first output and begin sending its second output to the controller 160. This will result in the production of an error signal on the output 164. Thermal sensors may also be located on or near other potentially temperature-sensitive items, such as the housing 108 or the laser 104 therewithin.

FIG. 1 depicts the controller 160 as enabling a laser power supply 166 to energize the laser 104 via the power leads 110, which originate at the power supply 166. Such enabling is effected via a link 168 between the controller 160 and the power supply 166. Connected to the power leads 110 between the power supply 166 and the laser 104 are normally closed circuit interrupters, which are not shown, but which are indicated by the reference numeral 170. These interrupters normally permit the power supply 166 to energize the laser 104 whenever the controller 160—as directed by the PC 162—so directs. The interrupters 170 are selectively operable to open, thereby opening the power leads 110 and de-energizing the laser 104. The controller output 164 is connected to the interrupters 170 so that if an error signal is present on the output 164, the interrupters 170 immediately open. Immediate termination of energization of the laser 104 in response to an error signal on the output 164 prevents untoward damage caused by the laser 104 being energized too long or at inappropriate times.

Whenever an error signal appears on the output 164, the controller may also apply a first signal to the solenoid 136 through the power amplifier to initiate closing of the shutter 102. If the shutter 102 is already closed—in its first position—the first signal will effect no movement of the shutter 102. If the shutter 102 is between its extreme positions or is fully open, it is immediately closed by the first signal. This action helps to ameliorate damage to the workpiece and the system in the event that power to the laser 104 is not interrupted or is interrupted after some delay.

The solenoid 135 is energized by shaped current pulses (FIG. 2) produced by the controller 160. These shaped current pulses are sent by the controller 160 to the power amplifier 154, operating as a controlled current source, where they are amplified to current magnitudes that effectively and efficiently operate the solenoid 136 to produce rapid, controllable rotation of the shutter 102.

Figure 2A:
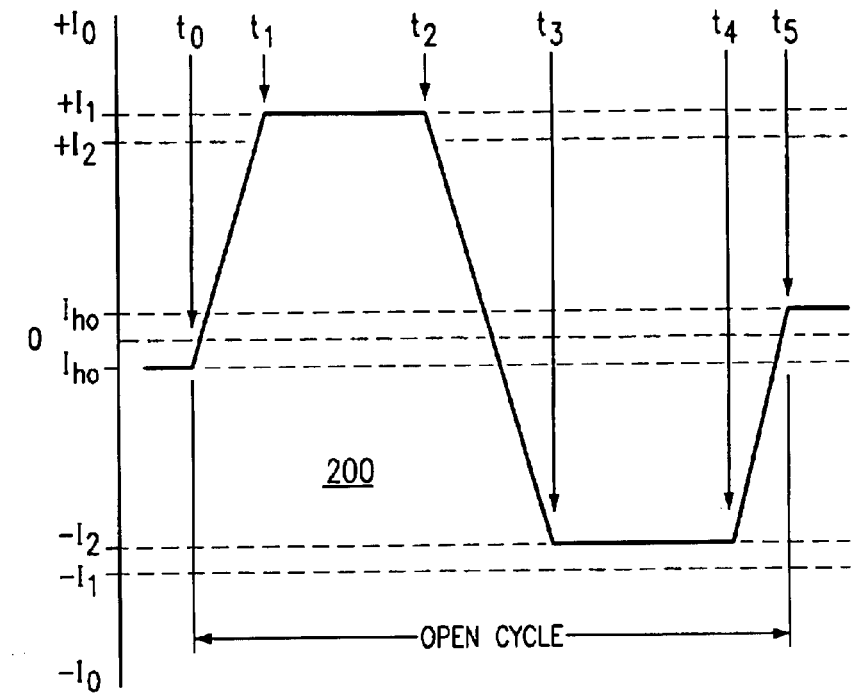
FIG. 2 is a graphical depiction of current pulses which are applied to the actuator of FIG. 1 to operate the shutter.

Referring now to FIG. 2, FIG. 2a generally depicts a shaped second or opening signal 200 applied by the controller 160 and the power amplifier 154 to the solenoid 136 via its power leads 138. The Y-axis is the magnitude of the current applied by the power amplifier 160 to the solenoid; the X-axis is time. The shape, duration and magnitude of the signal 200 may be preset in the controller 160 but are preferably directed by the PC 162 following appropriate manipulation by a human operator or storage of an appropriate program. The second or opening signal 200 is intended to move the shutter 102 from its closed position 124 to its open position 126, to permit the output of the laser 104 to impinge for a selected time on a workpiece on the stage 122.

Prior to $t_0$, a small negative current $I_{hc}$ ("hold closed current") is applied to the solenoid 136 which current is sufficient to hold the shutter in the closed position 122. As noted above, if the position sensor 150 is producing a second output, or if the position sensor 152 is producing a first output, or if both sensors 150,152 are producing a second output, the shutter 102 is not in the closed position 124 as it should be. As a consequence, the controller 160 senses the discrepancy, produces an error signal on the output 164 to open the relays 170, thereby de-energizing the laser 104 and/or preventing it from becoming energized.

At $t_0$, and continuing through $t_1$, a rapidly increasing current is applied to the solenoid 136 to accelerate the shutter 102 toward the open position 126. The shutter 102 reaches maximum velocity at $t_1$, when the current has a value of $+I_1$. Between $t_1$ and $t_2$, the current is maintained at $+I_1$ and the shutter 102 is maintained at its maximum velocity. Between $t_2$ and $t_3$ a rapidly decreasing current, which ultimately reaches a value of $-I_2$ is applied to the solenoid 136 to decelerate the shutter 102. Between $t_3$ and $t_4$, a constant negative current $-I_2$ is applied to the solenoid 102; during this time period, the shutter 102 or the armature of the solenoid 136 abuts a mechanical stop (not shown) defining the open position 126 of the shutter 102 Oust as it abuts a similar mechanical stop in its closed position 124). This abutment occurs as the shutter 102 is moving at a low velocity—as the current nears $-I_2$—to prevent impact damage to the shutter 102 and the solenoid, and to avoid unwanted vibrations in the system 100. At or before $t_4$ is reached the shutter 102 is fully open. Between $t_4$ and $t_5$ the current increases to a small positive value $I_{ho}$ ("hold open current") which is sufficient to hold and maintain the shutter 102 fully open.

An operator or a stored program may manipulate and operate the PC 162 to effect the production by the controller 160 of a variety of open pulses 200. The slopes of the current from $t_0$ to $t_1$, from $t_2$ to $t_3$ and from $t_4$ to $t_5$ may be adjusted by adjusting the time periods $t_0$–$t_1$, $t_2$–$t_3$ and $t_4$–$t_5$, and the magnitudes of $+I_1$ and $-I_2$. The time periods $t_1$–$t_2$ and $t_3$–$t_4$ are also adjustable. In this way the acceleration, velocity and position of the shutter 102 at any time during its movement between the closed and open positions 124,126—or vice versa—may be adjusted to deliver a selected amount of energy over a selected amount of time from the laser 104 to the workpiece.

Figure 2B:
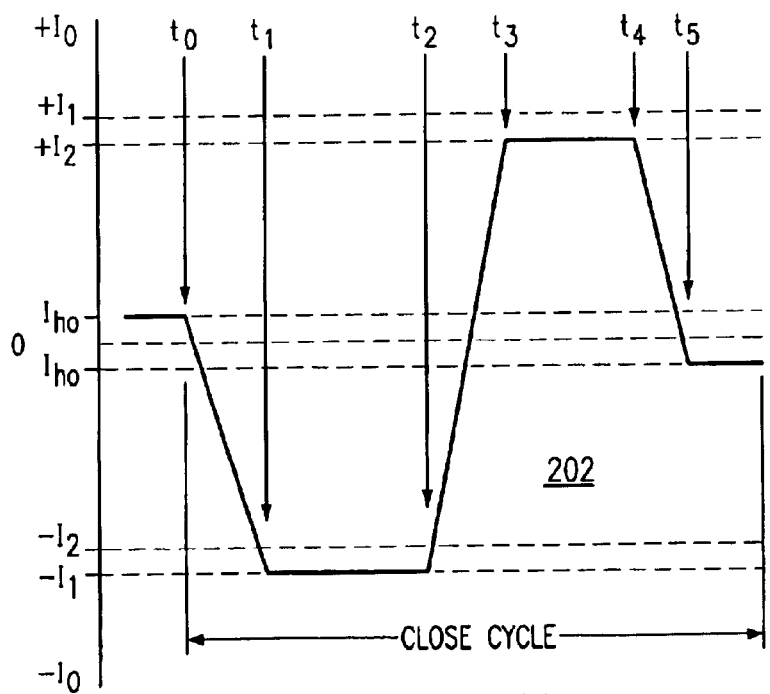

The current signal 202 applied to the solenoid 136 by the power amplifier 154 as the shutter 102 is moved from the open position 126 to the closed position 124 is the mirror image of that which is applied during the opening operation, with the polarities of FIG. 2a being reversed, as may be seen in FIG. 2b. In preferred embodiments, an Open Cycle and a Close Cycle—each depicted in FIG. 2—both occur in about 5 milliseconds, although other cycle times are clearly obtainable. The absolute value of $+I_1$, $-I_1$, $+I_2$ and $-I_2$ is, in one embodiment, about 4 amps, and the absolute value of the holding currents applied before to in FIGS. 2a and 2b and after $t_5$ in both Figures is about 100 milliamps, although, again, these values are also adjustable. For example, FIG. 2 depicts the absolute value of $+I_1$ and $-I_1$ being slightly greater (about 100 milliamps) than the absolute value of $+I_2$ and $-I_2$. The laser 104 may be continuously on, with the shutter 102 being responsible for opening and closing to effect the serial application of selected amounts of radiant energy to the workpiece. The laser 104 may also be pulsed. The reflective flag 128 and the light absorber 142 are responsible for directing the light in a benign manner, as discussed earlier, when the shutter 102 is closed as the laser remains energized.

Although certain embodiments of the present invention are described herein, it is understood that the scope of the invention is to be determined by the appended claims and that equivalents of specific elements described herein are understood to be covered by such claims.

What is claimed is:

1. A fast mechanical shutter for selectively (i) intercepting and deflecting, and (ii) permitting the passage of, high-power radiant emissions, comprising:

a bi-directional actuator having an output member which is rapidly movable between a first position and a second position by respective first and second shaped current signals applied to the actuator;

a radiant energy reflector that is carried by the output member, which, in the second position of the output member, resides out of the path of, and permits the passage of, the radiant emissions, and which in the first position of the armature, intercepts and reflects the radiant emissions;

a radiant emissions absorber positioned to receive the radiant emissions reflected from the reflector in its first position;

circuitry for applying a selected shaped current signal to the actuator to move the reflector to a selected position;

first sensing facilities for monitoring the actual position of the reflector and for producing a first error signal if the selected position and the actual position do not match;

second sensing facilities for measuring the temperature of the actuator and for producing a second error signal if the temperature exceeds a predetermined limit; and first facilities for producing a fault signal in response to receipt of an error signal from the first and second sensing facilities.

2. A shutter as in claim 1, wherein:

the actuator is a rotary actuator and the output member is rotatably movable thereby.

3. A shutter as in claim 2, wherein:

the actuator is a rotary solenoid.

4. A shutter as in claim 2, wherein:

the actuator is a multiphase AC motor.

5. A shutter as in claim 2, wherein:

the actuator is a brushless DC motor.

6. A shutter as in claim 1, which further comprises second facilities responsive to receipt of a fault signal for effecting operation of the current signal-applying circuit to move the reflector to its second position if it is not presently thereat.

7. A shutter as in claim 1, wherein:

when the reflector is in its first or second position, the current signal-applying circuit applies a holding current to the solenoid so that absent the applying means applying a second or first shaped pulse to the solenoid, the reflector remains in its extant position.

8. A fast mechanical shutter for selectively (i) intercepting and deflecting, and (ii) permitting the passage of, high-power radiant emissions, comprising:

a rotary bi-directional actuator having a rotatable output member which is rapidly rotatable between a first position and a second position by respective first and second shaped current signals applied to the actuator;

a radiant energy reflector that is carried by the output member, which, in the second position of the output member, resides out of the path of, and permits the passage of, the radiant emissions, and which in other than the second position of the armature, partially or wholly intercepts and reflects the radiant emissions;

a radiant emissions absorber positioned to receive the radiant emissions reflected from the reflector;

circuitry for applying a selected shaped current signal to the actuator to move the reflector to a selected position;

first sensing facilities for monitoring the actual position of the reflector and for producing a first error signal if the selected position and the actual position do not match;

second sensing facilities for measuring the temperature of the actuator and for producing a second error signal if the temperature exceeds a predetermined limit; and first facilities for producing a fault signal in response to receipt of an error signal from the first and second sensing facilities.

9. An actuator for moving a mechanical shutter between a first position, whereat the shutter blocks the passage of a beam of radiant energy, and a second position, whereat the shutter permits the passage of the beam, which comprises:

an electrically operable bi-directional actuator, an armature of which is selectively movable into a first position or a second position for carrying the shutter into its first or second positions; and a circuit for selectively, positively forcing and driving the armature into either of its positions, whereat the armature remains unless and until the armature is positively forced and driven into its other position, wherein the circuit produces a first shaped current signal, which rapidly moves the shutter into its first position if it is not presently thereat and holds the shutter in its first position if it is presently thereat, and a second shaped current signal, which rapidly moves the shutter into its second position if it is not presently thereat, and holds the shutter in its second position if it is presently thereat; and facilities for selectively shaping and determining the start time and duration of, the current signals to selectively set when the shutter begins to move from one position to the other, the velocities at which the shutter moves, the acceleration and deceleration of the shutter, and the position of the shutter during its movement, wherein the shutter is normally in its first position; and the circuit produces in rapid order the second shaped current signal and the first shaped current signal, the shaping facilities determining the time between the start of the second current signal and the end of the first current signal, such time being the length of time the shutter permits the radiant energy to pass; and wherein during a first portion of the shutter movement from one position to the other, the shutter is accelerated to a predetermined maximum velocity, then held at that maximum velocity for a predetermined length of time, then decelerated at a predetermined rate, then stopped and held at the other position; wherein the shutter is a dielectric member which is an efficient reflector at the wavelength of the radiant energy; and in the first position of the shutter, the radiant energy is blocked and is reflected by the shutter away from the path taken to reach the shutter; and the reflector is a planar member which is not coplanar or parallel with a plane of its rotation by the armature, which plane of rotation is generally normal to the path of the radiant energy, so that in its first position, the reflector intercepts the radiant energy beam and reflects the beam angularly away from the path thereof.

10. An actuator for moving a mechanical shutter between a first position, whereat the shutter blocks the passage of a beam of radiant energy, and a second position, whereat the shutter permits the passage of the beam, which comprises:

an electrically operable bi-directional actuator, an armature of which is selectively movable into a first position or a second position for carrying the shutter into its first or second positions; and a circuit for selectively, positively forcing and driving the armature into either of its positions, whereat the armature remains unless and until the armature is positively forced and driven into its other position; and the shutter is a dielectric member which is an efficient reflector at the wavelength of the radiant energy; wherein the reflector is a planar member which is not coplanar or parallel with a plane of its rotation by the armature, which plane of rotation is generally normal to the path of the radiant energy, so that in its first position, the reflector intercepts the radiant energy beam and reflects the beam angularly away from the path thereof.

* * * * *